United States Patent

Kamiya

[11] Patent Number: 5,585,742
[45] Date of Patent: Dec. 17, 1996

[54] BUS DRIVERS USING SKEW COMPENSATION DELAY CIRCUITS FOR ENABLING TRISTATE OUTPUT BUFFERS

[75] Inventor: Hiroshi Kamiya, Tokyo, Japan

[73] Assignee: NEC Corporation, Tokyo, Japan

[21] Appl. No.: 500,783

[22] Filed: Jul. 11, 1995

[30] Foreign Application Priority Data

Jul. 11, 1994 [JP] Japan ................................. 6-157764

[51] Int. Cl.[6] ........................ H03K 19/096; H03K 19/003
[52] U.S. Cl. ............................... 326/56; 326/86; 326/93; 326/9
[58] Field of Search ................................. 326/56, 57, 58, 326/86, 93, 9

[56] References Cited

U.S. PATENT DOCUMENTS

| 4,945,264 | 7/1990 | Lee et al. ................................. | 326/56 |
| 5,225,723 | 7/1993 | Drako et al. ............................. | 326/56 |

FOREIGN PATENT DOCUMENTS

| 63-232620 | 9/1988 | Japan ................................. | 326/56 |
| 3-252218 | 11/1991 | Japan ................................. | 326/56 |
| 4-291512 | 10/1992 | Japan ................................. | 326/56 |

Primary Examiner—Edward P. Westin
Assistant Examiner—Benjamin D. Driscoll
Attorney, Agent, or Firm—Young & Thompson

[57] ABSTRACT

In a bus system of a computer, an enable pulse is propagated through different signal paths and bus drivers so that it takes different amounts of time to reach a common bus. Each bus driver has a tristate output buffer connected to the bus, a delay circuit and an AND gate for receiving an enable pulse from one of the signal paths. The input terminal of the delay circuit is also connected to receive the same enable pulse for introducing a predetermined amount of delay to the enable pulse and supplying the delayed pulse to the AND gate, so that the delayed pulse is truncated at the trailing edge of the enable pulse directly supplied to the AND gate. The output terminal of the AND gate is connected to the enable/disable input terminal of the tristate output buffer for enabling it with the delayed and truncated enable pulse. The amounts of delays introduced in the bus drivers are manually set so that the delayed pulses would arrive at nearly the same time at the respective output buffers if they were simultaneously transmitted.

7 Claims, 3 Drawing Sheets

BUS DRIVERS USING SKEW COMPENSATION DELAY CIRCUITS FOR ENABLING TRISTATE OUTPUT BUFFERS

BACKGROUND OF THE INVENTION

1. Field of the Invention

The present invention relates generally to bus systems of a computer, and more specifically to input/output bus drivers for preventing collision of data accessing a common bus.

2. Description of the Related Art

In a computer system, a plurality of input/output bus drivers are used to access a bus. Each bus driver includes an input buffer for amplifying signals from the bus and a tristate output buffer for amplifying signals to the bus. The tristate output buffer has an enable/disable input terminal which is responsive to an enable pulse for enabling the output buffer to pass signals to the bus. In a sequential circuit, the arrival of a signal at two or more places may be significantly different, when it should have arrived at nearly the same time. Since an enable pulse for each tristate output buffer is propagated through a different path, skew is said to be present when the difference in arrival times is great enough to cause a bus collision if the bus is accessed successively. As the number of peripheral devices increases, the number of input/output bus drivers increases accordingly, and the probability of bus collisions increases.

SUMMARY OF THE INVENTION

It is therefore an object of the present invention to provide a bus system for a computer using a plurality of bus drivers capable of avoiding bus collision.

According to the present invention, there is provided a bus system for a computer wherein an enable pulse is propagated through different signal paths so that the enable pulse takes different amounts of time to propagate therethrough. The inventive bus system includes a bus, and a plurality of bus drivers. Each of the bus drivers includes a tristate output buffer having a data input terminal, an enable/disable input terminal and an output terminal which is connected to the bus, and a delay circuit having an input terminal connected to a respective one of the paths for receiving the enable pulse and an output terminal connected to the enable/disable input terminal of the tristate output buffer, the delay circuit of each of the drivers providing a delay to the received enable pulse by a predetermined time interval so that the delayed enable pulses of the drivers do not overlap with each other.

Preferably, a coincidence gate is provided having a first input terminal connected to the respective one of said paths for receiving the enable pulse, a second input terminal connected to the output terminal of the delay circuit, and an output terminal connected to the enable/disable input terminal of the tristate output buffer, whereby the delayed enable pulse is truncated at the trailing edge of the enable pulse supplied to the first input terminal of the coincidence gate.

BRIEF DESCRIPTION OF THE DRAWINGS

The present invention will be described in further detail with reference to the accompanying drawings, in which.

DETAILED DESCRIPTION

Figure 1:
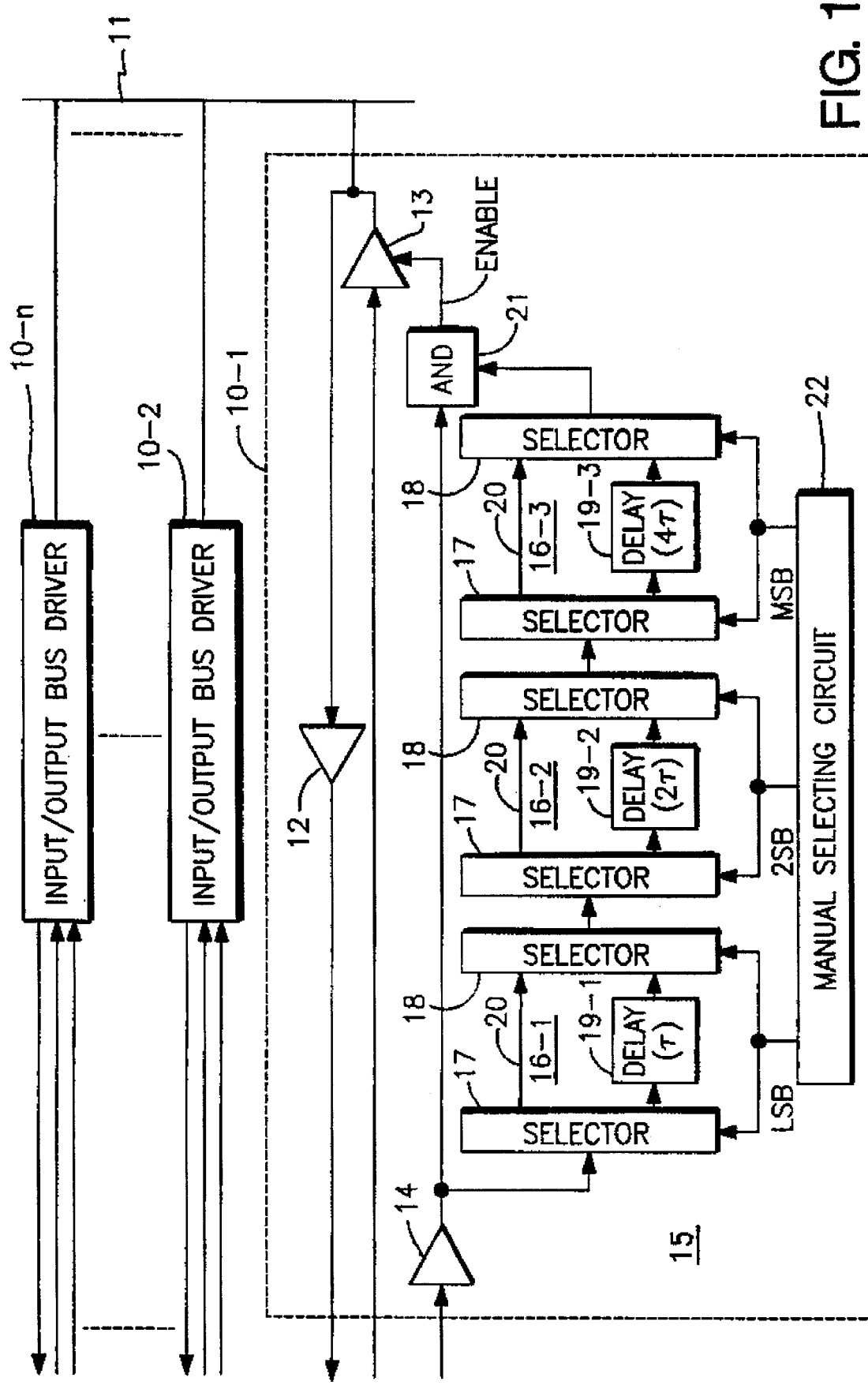
FIG. 1 is a block diagram of multiple input/output bus drivers of the present invention connected to a bus of a computer system.

In FIG. 1, there is shown a bus system of a computer according to the present invention. A plurality of I/O bus drivers 10-1 through 10-n of the present invention are connected to a bus 11 of the computer. Each I/O bus driver 10 includes an input buffer 12 which amplifies signals on the bus going to the CPU, not shown, and a tristate output buffer 13 which amplifies signals from the CPU to the bus. The tristate output buffer 13 has an enable/disable input terminal to which an enable pulse is supplied from an AND gate 21. The output terminal of the tristate output buffer 13 is in a high impedance state when the enable/disable input is at low (disabled) level. When the enable/disable input is high, the output buffer 13 allows signals to be passed therethrough to the bus 11. To the inputs of AND gate 21 are connected the output of a buffer amplifier 14 and the output of a switched delay-line circuit 15. The input of buffer amplifier 14 is connected to a respective one of different paths through which an enable pulse is transmitted. The input of the switched delay-line circuit 15 is connected to the output of the buffer amplifier 14.

In a bus cycle, the CPU supplies an enable pulse through one of different signal paths to a desired I/O bus driver and is received by the buffer amplifier 14 of the I/O bus driver where it is amplified and applied to the AND gate 21 as well as to the delay circuit 15. Switched delay-line circuit 15 comprises a plurality of switched stages connected in cascade between amplifier 14 and AND gate 21. Three switched stages 16-1, 16-2 and 16-3 are illustrated as an example. Each delay-line stage 16-i (i=1, 2, 3) has identical input and output selectors 17 and 18 and a delay element 19-i which provides a delay of a particular amount to the delay-line stage. The delay times introduced by elements 19-1, 19-2 and 19-3 are $\tau$, $2\tau$ and $4\tau$, respectively, where $\tau$ is the unit delay time. The selectors 17 and 18 of each delay circuit are controlled by a significant bit of a 3-bit digital value supplied from a manual setting circuit 22, with the significant bit corresponding to the delay time of the delay circuit. Thus, the selectors of delay-line stages 16-1, 16-2 and 16-3 are controlled by the least, second and most significant bits, respectively.

Figure 2:
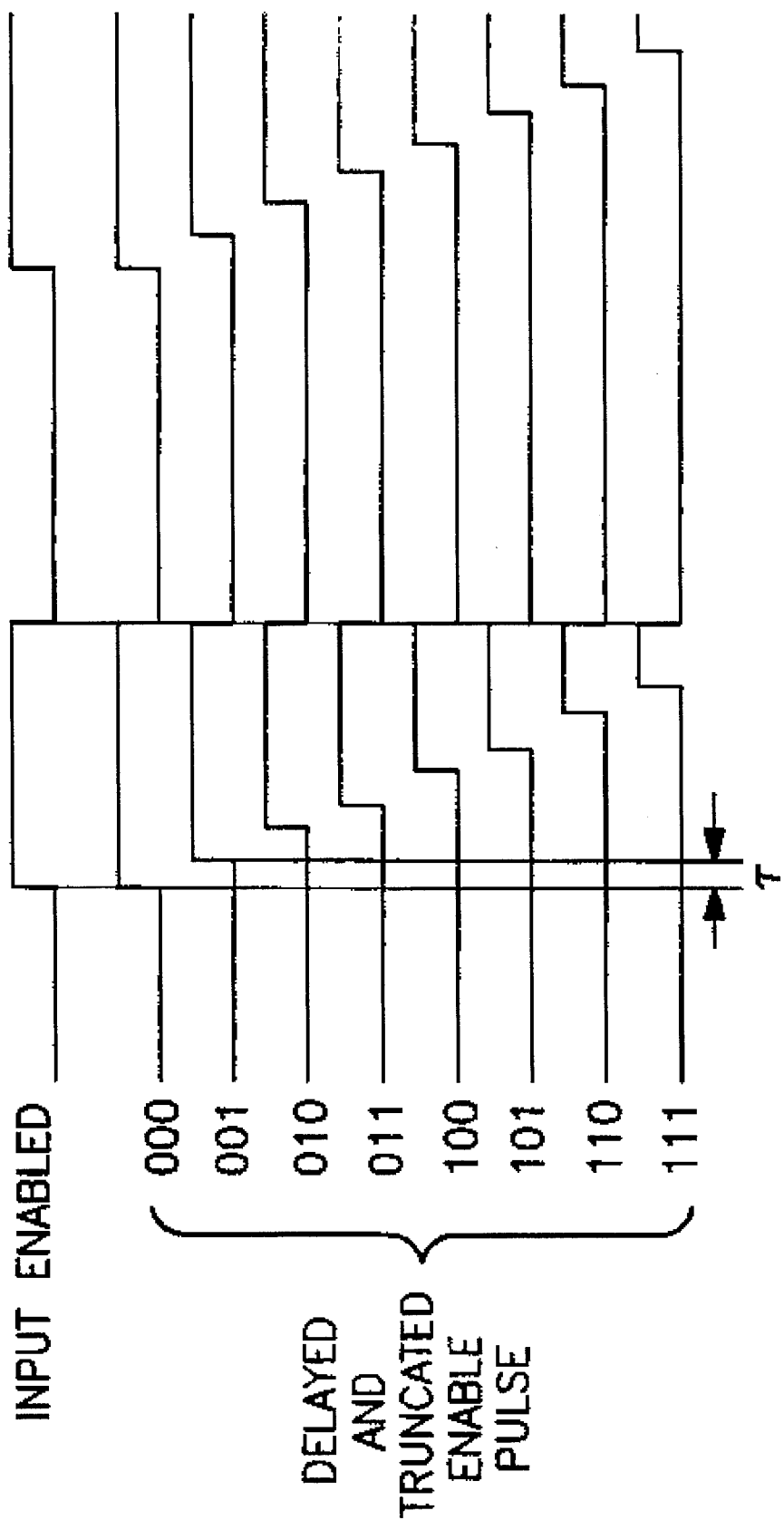
FIG. 2 is a timing diagram of delayed enable pulses for enabling the output gate of each I/O bus driver at different times in response to a 3-bit digital value.

In each of the delay-line stages, the selectors 17 and 18 respond to a logic-0 in the corresponding significant bit for coupling a line 20 between the input of selector 17 to the output of selector 18 and respond to a logic-1 for coupling the delay unit 19 therebetween, instead of line 20. If the manual setting circuit 22 produces a 3-bit value "000", no delay is introduced to the input enable pulse. The amount of total delays introduced by the delay-line circuit 15 is in the range from 0 to $7\tau$ corresponding respectively to "000" to "111" as illustrated in FIG. 2. The delayed enable pulse at the output of delay-line stage 16-3 is logically summed with the input enable pulse in the AND gate 21 so that the trailing edge portion of the delayed pulse is truncated at a point corresponding to the trailing edge of the input enable pulse.

Each delay unit 19 is a well-known analog delay circuit such as a grounded capacitor circuit, a grounded-capacitor resistor circuit, or a grounded-capacitor inductor circuit.

Because of a different path taken by each enable pulse from the CPU to the respective I/O bus driver, an enable pulse supplied to different drivers may arrive at significantly different times, when it should have arrived at more nearly the same time. Skew is said to be present when the difference in arrival times is great enough to cause malfunction of circuits. Prior to making a manual adjustment of each I/O bus driver, all the bus drivers 10-1 to 10-n are manually tested for their skews. One of I/O bus drivers having a maximum skew is identified and assigned a minimum 3-bit value. The other I/O bus drivers are assigned 3-bit values corresponding respectively to the amounts of their respective skews so that the enable pulses transmitted to all I/O bus drivers would arrive at nearly the same instant at the corresponding tristate output buffers 13 if they were simultaneously transmitted from the CPU.

Figure 3:
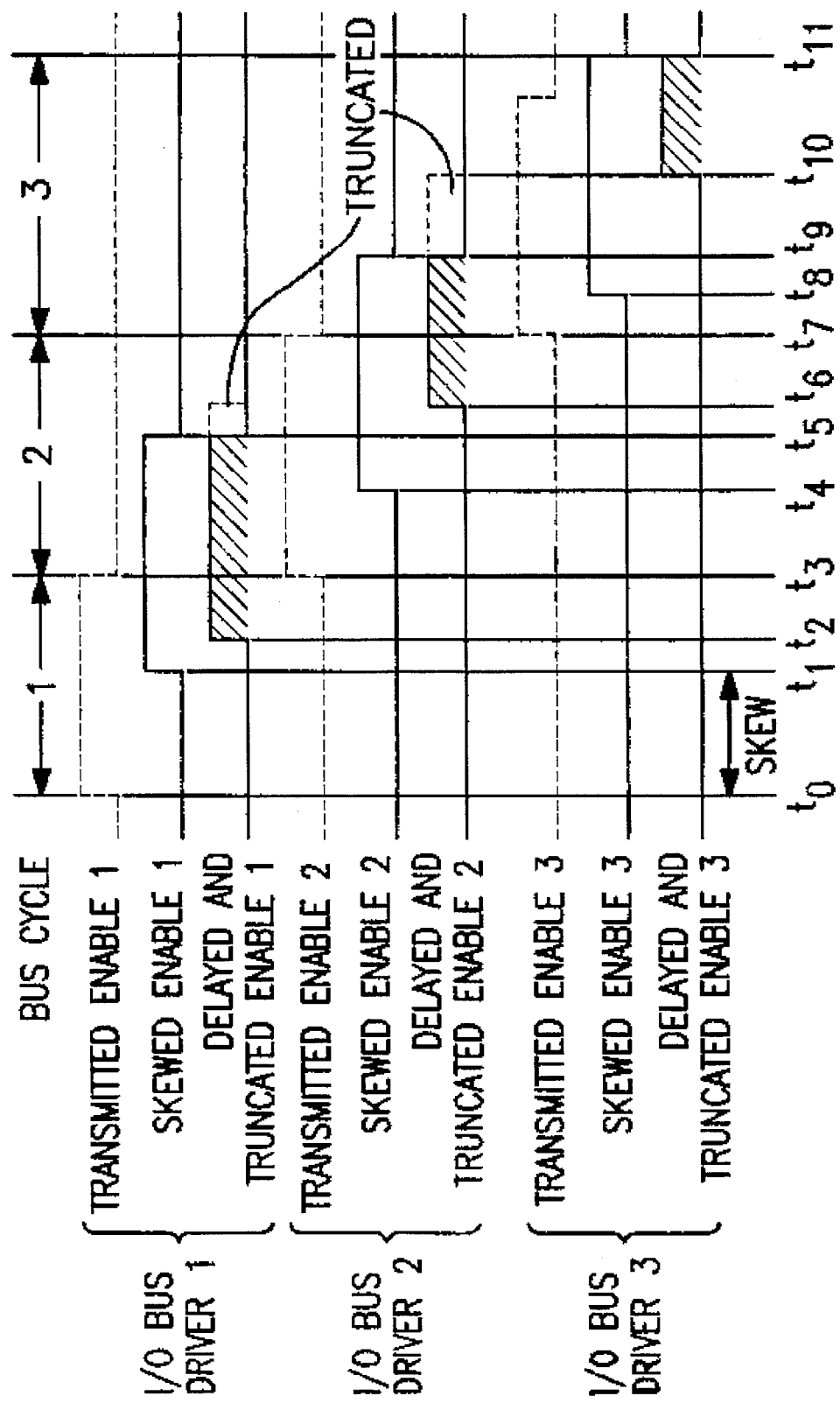
FIG. 3 is a timing diagram of delayed enable pulses which may occur in a possible worst situation for describing the operation of the present invention.

With the introduction of delays as described, consider a worst case where three enable pulses are generated by the CPU during successive bus cycles and applied to respective I/O bus drivers, which are conveniently designated as 1, 2 and 3, where the I/O bus driver 1 is the one having the maximum skew and is given a minimum delay. The enable pulses of these bus drivers are likewise designated by corresponding numerals 1, 2 and 3, as shown in FIG. 3. Assume that the enable pulse 1 is transmitted at time $t_0$ from the CPU to I/O bus driver 1 and, because of the maximum skew corresponding to a period $t_0$ to $t_1$, it arrives at the driver 1 at time $t_1$ and is delayed by a minimum period $t_1$ to $t_2$, and truncated at time $t_5$. The second input enable pulse 2, transmitted at time $t_3$, arrives at time $t_4$ because of its skew corresponding to period $t_3$ to $t_4$. This pulse is delayed by a period $t_4$ to $t_6$ and truncated at time $t_9$. The third input enable pulse 3, transmitted at time $t_7$, arrives at time $t_8$ because of its skew corresponding to a period $t_7$ to $t_8$. This pulse is delayed by a period $t_8$ to $t_{10}$ and truncated at time $t_{11}$.

It is seen that because of the delays introduced by the I/O bus drivers, the leading edge of each successive enable pulse occurs after the trailing edge of a preceding enable pulse. Due to the introduction of delay and truncation of pulses, a sufficient separation is provided between successive enable pulses. For example, a period $t_5$ to $t_6$ is provided between the trailing edge of pulse 1 and the leading edge of pulse 2 and a period $t_9$ to $t_{10}$ is provided between the trailing edge of pulse 2 and the leading edge of pulse 3. These pulse separations serve as a guard time which not only prevents data collision, but allows a pulse to decay at the trailing edge to zero before the occurrence of a subsequent pulse.

What is claimed is:

1. A bus system for a computer wherein enable pulses are transmitted in succession and respectively propagated through paths of different lengths so that said enable pulses take different amounts of time to propagate therethrough, comprising:

a bus; and a plurality of bus drivers, each of the drivers including a tristate output buffer having a data input terminal, an enable/disable input terminal and an output terminal which is connected to the bus, and a delay circuit having an input terminal connected to a respective one of said paths for introducing a delay to one of the enable pulses so that the delayed enable pulses of the drivers do not overlap with each other, the enable/disable input terminal of the delayed enable pulse for applying a data signal at the data input terminal to the bus, the amounts of delays respectively introduced by the bus drivers being such that the delayed enable pulses would arrive at nearly a same instant at said bus if they were initially transmitted simultaneously.

2. A bus system for a computer, wherein enable pulses are transmitted in succession and respectively propagated through signal paths of different lengths so that said enable pulses take different amounts of time to propagate therethrough, comprising:

a bus; and a plurality of bus drivers, each of the drivers including a tristate output buffer having a data input terminal, an enable/disable input terminal and an output terminal which is connected to the bus, and a delay circuit for introducing a delay to one of the enable pulses so that the delayed enable pulses of the drivers do not overlap with each other, the enable/disable input terminal of the tristate output buffer being responsive to the delayed enable pulse for applying a data signal at the data input terminal to the bus, the amounts of delays respectively introduced by the bus drivers being such that the delayed enable pulses would arrive at nearly a same instant at said bus, if said delayed enable pulses were initially transmitted simultaneously, wherein said delay circuit comprises:

a plurality of delay elements, each delay element providing a delay in an amount unique to the delay element; and a plurality of selectors for selectively connecting said delay elements in cascade in accordance with a multi-bit signal.

3. A bus system as claimed in claim 2, wherein each of said delay elements is an analog delay element.

4. A bus system as claimed in claim 3, wherein each of said drivers includes a buffer amplifier connected to said respective one of said signal paths for amplifying the enable pulse and applying the amplified enable pulse to said delay circuit and said coincidence gate.

5. A bus system for a computer wherein enable pulses are transmitted in succession and respectively propagated through signal paths of different lengths so that said enable pulses take different amounts of time to propagate therethrough, comprising:

a bus; and a plurality of bus drivers, each of the drivers including:

a tristate output buffer having a data input terminal, an enable/disable input terminal and an output terminal which is connected to the bus, a delay circuit for introducing a delay to one of the enable pulses so that the delayed enable pulses of the drivers do not overlap with each other; and a coincidence gate having a first input terminal for receiving one of the enable pulses, a second input terminal connected to the output terminal of said delay circuit, and an output terminal connected to the enable/disable input terminal of the tristate output buffer for truncating a trailing portion of the delayed enable pulse at a point corresponding to a trailing edge of the pulse at the first input terminal of the coincidence gate, the amounts of delays respectively introduced by the bus drivers being such that the delayed enable pulses would arrive at nearly a same instant at said bus if said delayed enable pulses were initially transmitted simultaneously.

6. A bus system as claimed in claim 5, wherein said delay circuit comprises:

a plurality of delay elements, each delay element providing a delay in an amount unique to the delay element; and a plurality of selectors for selectively connecting said delay elements in cascade in accordance with a multi-bit signal.

7. A bus system as claimed in claim 5, wherein each of said drivers includes a buffer amplifier connected to said respective one of said signal paths for amplifying said one of the enable pulses and applying the amplified enable pulse to said delay circuit and said coincidence gate.

* * * * *